United States Patent [19]

Martinelli

[11] 4,366,849
[45] Jan. 4, 1983

[54] CABLE-TYPE TIRE CHAINS

[75] Inventor: Rene J. Martinelli, West Linn, Oreg.

[73] Assignee: Burns Bros., Inc., Portland, Oreg.

[21] Appl. No.: 246,362

[22] Filed: Mar. 23, 1981

[51] Int. Cl.³ ............................................. B60C 27/00
[52] U.S. Cl. ...................................... 152/221; 24/312;
    29/437; 152/242; 152/243; 403/274; 403/348
[58] Field of Search ................. 152/213 A, 219, 221,
    152/222, 225 R, 233, 241, 242, 239, 240, 243,
    244; 403/348, 274; 29/439, 437; 24/68 TT, 69
    TT, 70 TT, 71 TT, 115 A, 122.3, 129 B, 129 W,
    201 HE, 201 A, 265 H, 312

[56] References Cited

U.S. PATENT DOCUMENTS

| | | | |
|---|---|---|---|
| 1,185,084 | 5/1916 | Gahan | 152/221 |
| 1,325,322 | 12/1919 | Hamm | 152/244 X |
| 1,453,183 | 4/1923 | Robison | 152/242 |
| 1,537,567 | 5/1925 | Thomas | 152/242 |
| 2,637,363 | 5/1953 | Perlman | 152/213 |
| 3,752,204 | 8/1973 | Ouellette | 152/219 |
| 4,155,389 | 5/1979 | Dwinell | 152/221 |
| 4,155,390 | 5/1979 | Okamura | 152/222 |
| 4,280,545 | 7/1981 | Martinelli | 152/242 X |

Primary Examiner—William A. Powell
Assistant Examiner—Thomas Bokan
Attorney, Agent, or Firm—Shapiro and Shapiro

[57] ABSTRACT

A cable-type tire chain comprises side members adapted to extend circumferentially around opposite side walls of a tire and cross members connected between the side members so as to extend over and across the tire tread, the cross members carrying traction means in the form of traction sleeves. A low profile articulated connection is provided between each end of each cross member and one of the side members, the connection comprising one connector element crimped on the cross member and another connector element crimped on the side member. One connector element has a T-shaped head and the other element has a bent-over tab with an opening through which the head is inserted. When the tab is flattened the head is trapped in the other connector element. The connection allows for hinging movement of a cross member both laterally and circumferentially of a tire.

12 Claims, 3 Drawing Figures

4,366,849

CABLE-TYPE TIRE CHAINS

BACKGROUND OF THE INVENTION

The invention relates to cable-type chains for use on vehicle tires, for improving traction, for example, in ice or snow conditions. In particular, the invention is concerned with cable-type chains which include a pair of elongate flexible side members adapted to extend circumferentially around opposite side walls of a tire, and cross members provided with traction means such as traction sleeves, the cross members being connected between the side members so as to extend over and across the tire tread. Chains of this general type are well known; see, for example, U.S. Pat. No. 4,155,389.

It is desirable in the design of cable-type tire chains, to provide attachment means between the ends of the cross members and the respective side members which are simple and economical to manufacture and apply, and which provide a relatively low profile connection between the cross members and side members, which is useful, for example, in vehicle wheel wells having limited clearance. It is further desirable, for such attachment means to provide a secure connection while facilitating cross member replacement, and preferably the attachment means should allow for a degree of hinging as between the cross member ends and the side members, in order to accommodate changes in tire profile and also limited circumferential movement of the cross member. The present invention is directed towards providing a cable-type tire chain having attachment means adapted to fulfill the above criteria.

SUMMARY OF THE INVENTION

The invention provides, at least in a preferred form, a cable-type tire chain having a pair of elongate side members, cross members connected between the side members. The cross members being provided with traction means such as traction sleeves, and attachment means between the ends of the cross members and the respective side members, each attachment means comprising complementary connector elements secured to the cross member and side member respectively. One of the connector elements has a head and the other connector element has a plate with a bent-over tab defining an opening through which the head is inserted. The configuration of the head and the tab opening is such that when the tab is flattened toward the body of the plate, the head is trapped between the plate and tab preventing its removal through the opening.

The cooperative configurations of the head, tab, and opening are preferably such as to permit relative hinging movement between the connector elements in directions both laterally and circumferentially of a tire. The head is preferably formed on the connector element secured to the cross member, and the plate and tab on the other connector element, but certain advantages are retained if the configuration is reversed. In one preferred form, the head may comprise a substantially flat, T-shaped plate having a cross bar extending transversely to the longitudinal axis of the cross member.

Additional aspects and advantages of the invention will be apparent from the ensuing description and claims taken in conjunction with the accompanying drawings.

DESCRIPTION OF PREFERRED EMBODIMENT

Figure 1:
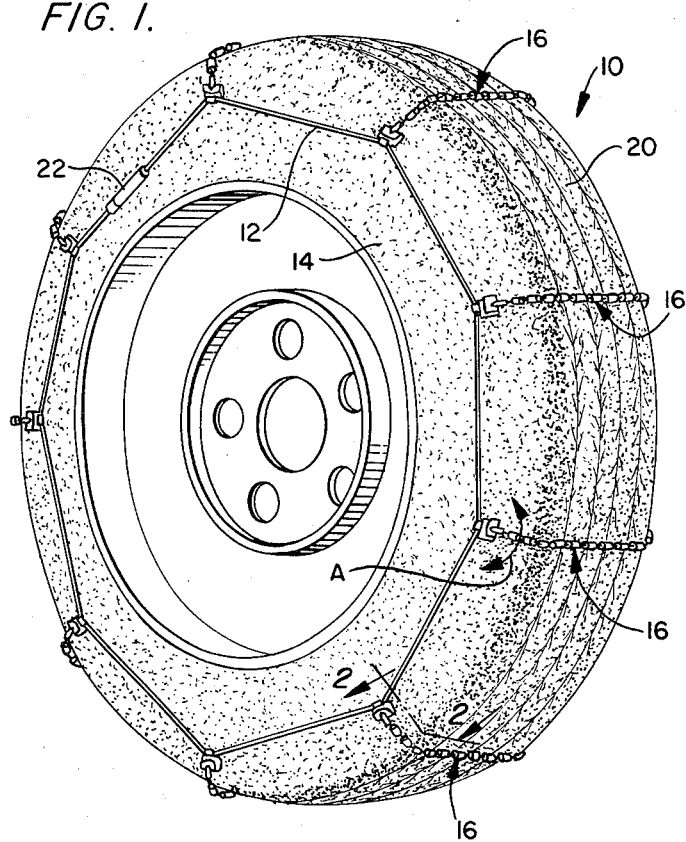
FIG. 1 is a perspective view of a vehicle tire equipped with a tire chain constructed in accordance with the invention.
Figure 2:
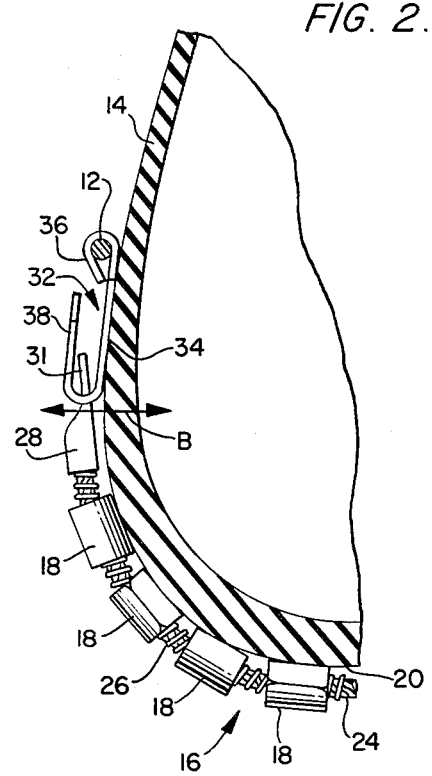
FIG. 2 is an enlarged sectional view on line 2—2 of FIG. 1.

As shown in FIGS. 1 and 2, a vehicle tire 10 is provided with a cable-type tire chain comprising flexible elongate side members 12, which extend circumferentially around opposite side walls 14 of the tire and cross members 16, carrying traction means in the form of traction sleeves 18, the cross members being connected between the side members and extending over and across the tire tread 20. Only one side member 12 is visible in the drawings, but it will be appreciated that a like side member is provided on the opposite side wall of the tire. The ends of the respective side members 12 may be connected together in known manner by any suitable connector 22 (FIG. 1) so that the cable chain securely embraces the tire. The side members 12 may, for example, comprise stranded metal cable or other suitable elongate flexible material.

Figure 3:
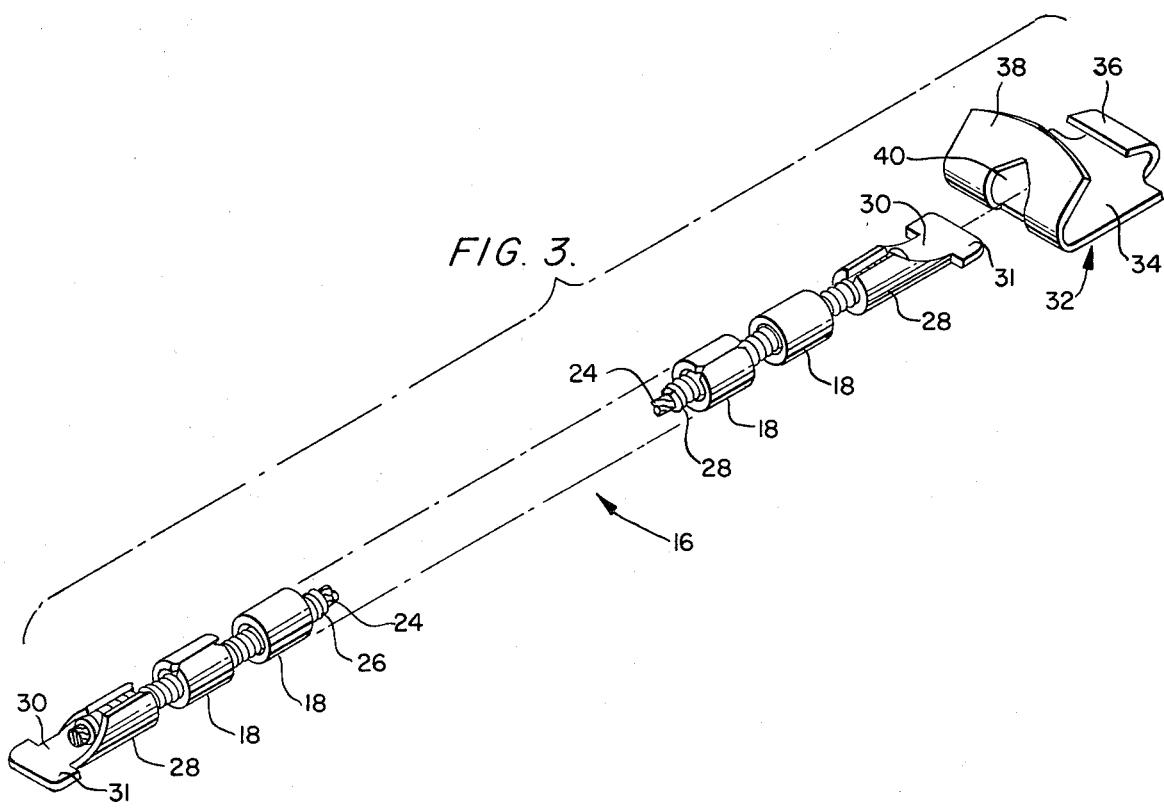
FIG. 3 is an exploded perspective view of parts of the tire chain shown in FIG. 1, including a cross member and connector elements.

Each of the cross members 16, see particularly FIGS. 2 and 3, comprises a length of cable 24, such as stranded metal aircraft cable, covered by a sheath of wire 26 wound helically around cable 24. The traction sleeves 18 are freely rotatably mounted over the wire sheath 26. The design of the traction sleeves is not critical to the present invention, and the sleeves may, for example, be of the type shown in the aforementioned patent, or may alternatively be of a type disclosed in copending patent application to Coutts, (U.S. Ser. No. 246,363) titled "Improvements Relating to Cable-Type Tire Chains", the copending application being filed concurrently herewith, and being commonly assigned herewith.

The opposite ends of each cross member are each provided with a connector element in the form of a metal bushing 28 crimped onto cable 24 and having a head in the form of a substantially flat, T-shaped plate 30. The heads 30 form part of attachment means for connecting the ends of the cross members to the respective side members, the attachment means, in each case, further including a complementary connector element 32.

Connector elements 32 may each comprise a metal plate 34, having a bent-over tab 36 at one end, by which the element may be firmly crimped to one of the side cables, and a further bent-over tab 38 at the other end, tab 38 being formed with an elongate opening 40 extending lengthwise of the element and being tapered at one end as shown. The shape and configuration of opening 40 is such that when the tab 38 is lifted away from plate 34 (as in FIG. 3), one of the heads 30 may be inserted through the opening by longitudinally orienting the crossbar 31 of the head 30 with the length of the opening. Then, when tab 38 is flattened toward the body of plate 34 (as in FIG. 2), head 30 becomes trapped between the tab and the body of the plate, since the flattened tab prevents the crossbar 31 from being oriented into longitudinal alignment with the opening. In the flattened condition of tab 38, however, the relative configuration of the head, the opening, and the tab and plate body, is such that a degree of hinging may take place between the connector elements both in the plane of plate 34 and perpendicularly to the plane of plate 34. These movements provide for a degree of hinging of the cross cables relative to the side cables circumferentially of a tire (as indicated, for example, by arrow A in FIG. 1) and laterally of the tire (as indicated, for example, by arrow B in FIG. 2). The circumferential hinging accommodates adjustment of the cross members circumferentially of the tire, while the lateral hinging accommodates changes in the tire profile.

The cross members may be removed from connector elements 32, if required, simply by lifting the tabs 38 by means of a tool, and suitably orienting the crossbars 31 relative to openings 40.

It will be seen from the foregoing that the invention, at least in a preferred form, provides attachment means between the cross members and side members of a cable-type tire chain, which attachment means is relatively simple and economical to manufacture, which provides relatively low profile connection between the cross members and side members, and which allows for hinging movement of a cross member relative to a side member both laterally and circumferentially of a tire. Further, the attachment means provide secure connections between the cross members and side members while allowing for simple disconnection therebetween for cross member replacement.

While only a single preferred embodiment of the invention has been described herein in detail, the invention is not limited thereby and modifications can be made within the scope of the attached claims.

I claim:

1. A cable-type tire chain having a pair of elongate side members, cross members connected between the side members, the cross members being provided with traction means, and attachment means between the ends of the cross members and the respective side members, each attchment means comprising complementary connector elements secured to a cross member and side member respectively, one of said elements including a head and the other element comprising a plate having a bent over tab flattened toward the body of the plate and means defining an opening formed through the plate, and through which opening the head is inserted, the head being trapped between the tab and the body of the plate by the flattened tab, and the configuration of the connector elements permitting relative hinging movements therebetween when the head is trapped as aforesaid.

2. A tire chain as defined in claim 1, wherein the connector element having the head is secured to the cross member.

3. A tire chain as defined in claim 1, wherein the head when trapped is adapted to permit hinging of the connector elements laterally of a tire upon which the chain is used.

4. A tire chain as defined in claim 1 or claim 3, wherein the head, when trapped, is adapted to permit hinging movement of the connector elements circumferentially of a tire upon which the chain is used.

5. A tire chain as defined in claim 1, wherein the head comprises a substantially flat T-shaped member with a crossbar extending substantially transversely to the longitudinal axis of the cross member.

6. A tire chain as defined in claim 5, wherein the configuration of the head and the opening is such as to permit insertion of the head in the opening and removal of the head from the opening by mutual lengthwise orientation of the crossbar and the opening when the tab is lifted away from the body of the plate.

7. In a cable-type tire chain having a pair of elongate side members and a cross member connected between the side members, the cross member being provided with traction means, attachment means between the cross member and one of the side members, the attachment means comprising complementary connector elements secured to the cross member and side member respectively, one of said elements including a head and the other element comprising a plate having a bent-over tab flattened toward the body of the plate and means defining an opening formed through the plate, and through which opening the head is inserted, the head being trapped between the tab and the body of the plate by the flattened tab, and the configuration of the connector elements permitting relative hinging movements therebetween when the head is trapped as aforesaid.

8. A tire chain as defined in claim 7, wherein the cross member is a cable, and wherein the connector element which is secured to the cross member includes a bushing crimped onto the cable.

9. A tire chain as defined in claim 8, wherein the element secured to the cross member is the element including a head and wherein the head is in the form of a substantially flat T-shaped plate extending from the bushing.

10. A tire chain as defined in claim 9, wherein the opening in the other element is an elongate opening configured for insertion and removal of the T-shaped plate with a cross-bar of the plate longitudinally oriented with the length of the opening when the tab is lifted away from the body of the plate.

11. A tire chain as defined in claim 10, wherein the opening extends into the tab.

12. A tire chain as defined in claim 8, wherein the traction means comprise traction sleeves on the cable.

* * * * *